(12) United States Patent
Wang et al.

(10) Patent No.: US 8,757,896 B2
(45) Date of Patent: Jun. 24, 2014

(54) ADAPTER FOR OPTICAL FIBER CONNECTOR

(75) Inventors: Leland Wang, Santa Clara, CA (US); Jun-Jin Pan, Shenzhen (CN); Min Dong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 211 days.

(21) Appl. No.: 13/337,427

(22) Filed: Dec. 27, 2011

(65) Prior Publication Data

US 2013/0163937 A1    Jun. 27, 2013

(51) Int. Cl.
*G02B 6/36* (2006.01)

(52) U.S. Cl.
USPC .................. 385/89; 29/428; 385/53; 385/73

(58) Field of Classification Search
USPC .................................. 385/89, 53, 73; 29/428
See application file for complete search history.

(56) References Cited

U.S. PATENT DOCUMENTS 6,357,931 B1 * 3/2002 Shirakawa et al. ............. 385/75

FOREIGN PATENT DOCUMENTS

TW            460049        10/2001

* cited by examiner

*Primary Examiner* — Ellen Kim
(74) *Attorney, Agent, or Firm* — Novak Druce Connolly Bove + Quigg LLP

(57) ABSTRACT

An adapter for an optical fiber connector includes a fixing base and two terminals. The fixing base has a main portion and two assembly portions formed on the main portion. The terminal has a positioning portion, a connecting portion, and an inserting portion. The connecting portion and the inserting portion extend from opposite ends of the positioning portion, and the positioning portion is positioned in the assembly portion of the fixing base.

16 Claims, 5 Drawing Sheets

ADAPTER FOR OPTICAL FIBER CONNECTOR

BACKGROUND

1. Technical Field

The present disclosure generally relates to optical fiber connectors, and particularly to an adapter for an optical fiber connector.

2. Description of the Related Art

An Intelligent Optical Distribution Network (iDON) has many functions, such as fiber identity management, port state collecting, and port search indicator, and is commonplace in the communications field. An optical connector used in an iDON generally has a chip and an adapter. The adapter electrically connects the chip to a printed circuit board of a router. The adapter includes a plastic fixing base and two metal terminals positioned on the fixing base. One metal terminal is connected to the chip, and the other metal terminal is connected to the printed circuit board. In the manufacturing of the adapter, the metal terminals are made first, and then the metal terminals are positioned in an injection mold. The mold injects plastic materials on the metal terminals to form the base. However, the metal terminals are very small, and thus it is difficult to position the metal terminals in the injection mold accurately. Therefore, the adapter has a relatively low manufacturing efficiency.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
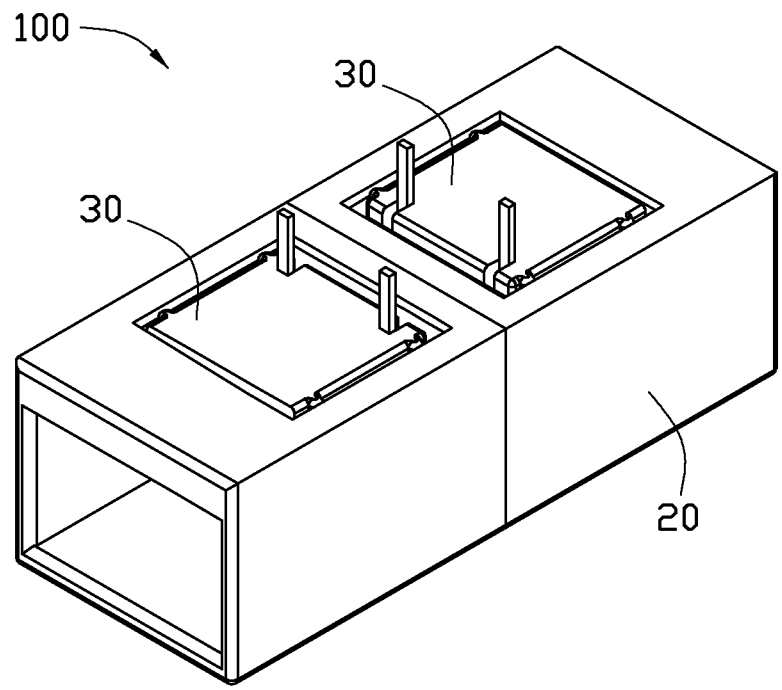
FIG. 1 is an isometric, assembled view of an embodiment of an optical fiber connector.

Referring to FIG. 1, an embodiment of an optical fiber connector 100 includes one receiving base 20 and two adapters 30 positioned on a side of the receiving base 20. The receiving base 20 axially receives two optical fiber plugs (not shown) on opposite ends thereof. In use, the optical fiber connector 100 is positioned on a printed circuit board (not shown). Each optical fiber plug has a chip inside thereof. The adapters 30 electrically connect the chips of the optical fiber plugs to the printed circuit board.

Referring to FIG. 1, the receiving base 20 includes two housings 22 connected to each other. Each housing 22 is substantially rectangular, and includes a first side plate 223, a second side plate 224, a third side plate 225, and a fourth side plate 226. The first side plate 223, the second side plate 224, the third side plate 224, and the fourth side plate 226 cooperatively define a receiving groove 227 for receiving an optical fiber plug.

The second side plate 224 defines an assembly groove 2242 communicating with the receiving groove 227. The second side plate 224 further forms a first support portion 2243 and two second support portions 2244 in the assembly groove 2242, and the second support portions 2244 are opposite to the first support portion 2243.

Figure 3:
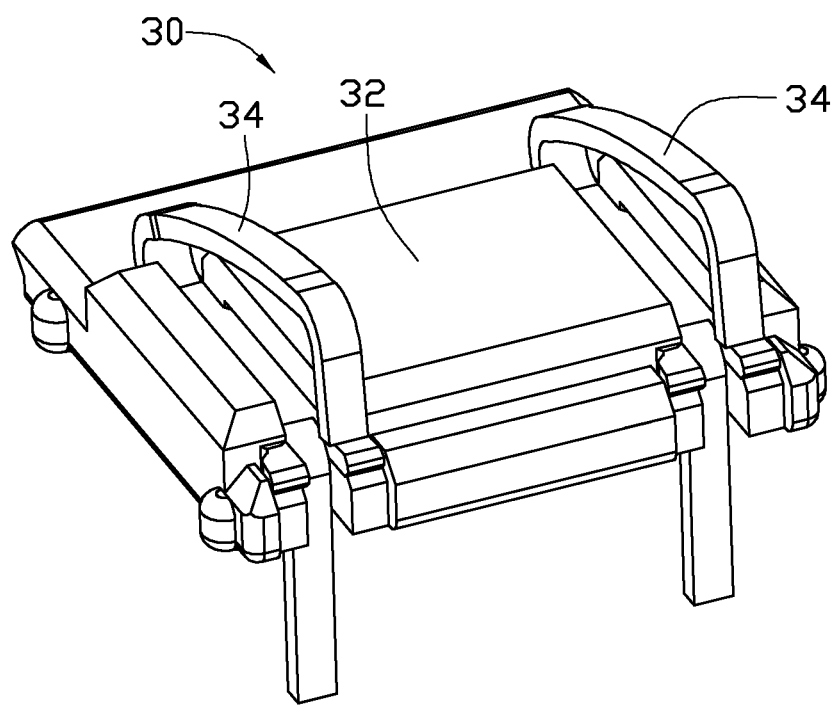
FIG. 3 is an isometric view of the adapter of FIG. 2.

Referring to FIG. 3, each adapter 30 includes one fixing base 32 and two terminals 34 positioned on the fixing base 32. In an illustrated embodiment, the fixing base 32 is made of plastic, and thus the fixing base 32 is suitable for mass production by injection molding. The terminals 34 are made of punched metal, and thus also suitable for mass production.

Figure 4:
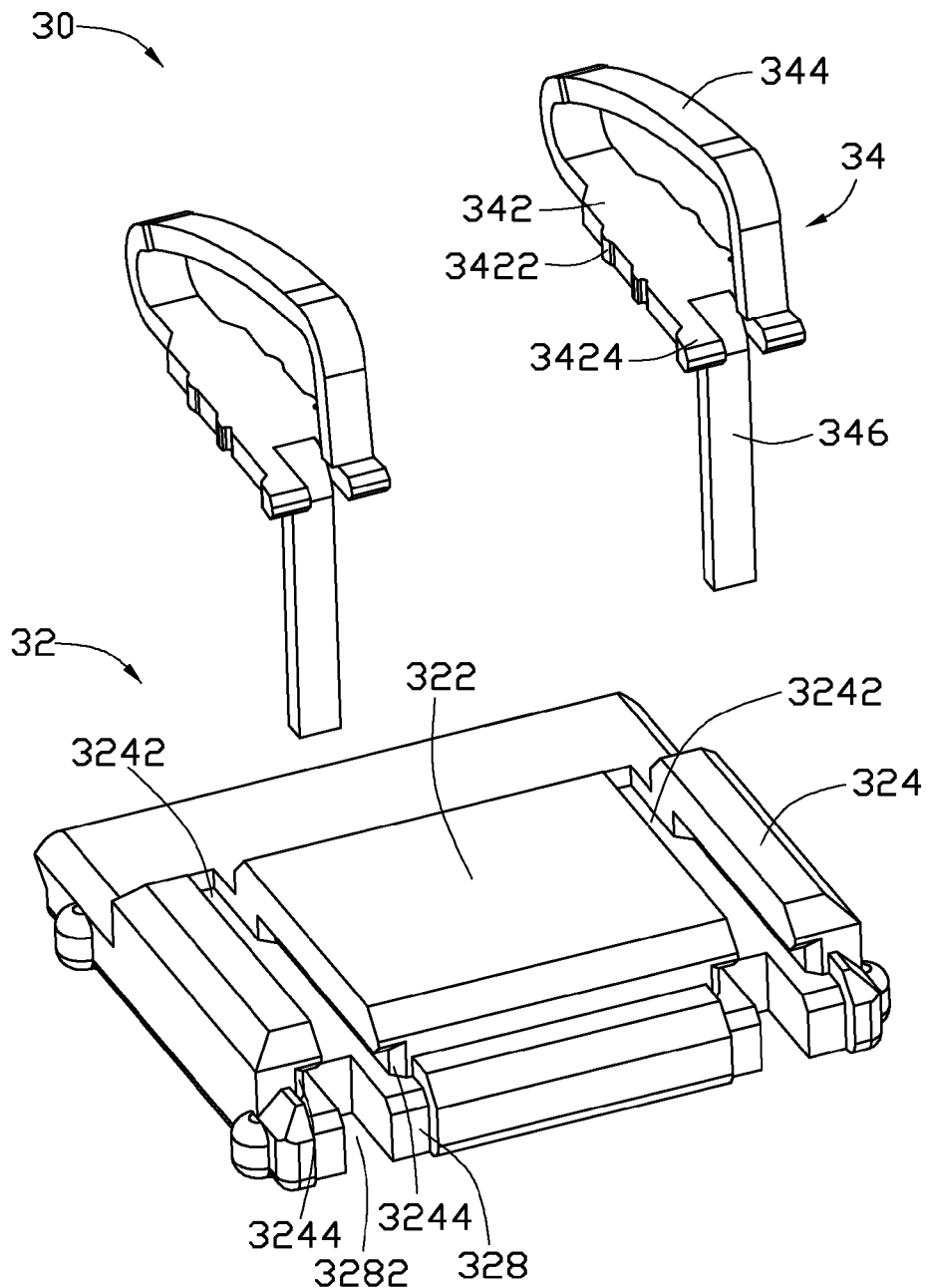
FIG. 4 is an exploded, isometric view of the adapter of FIG. 3.

Referring to FIG. 4, the fixing base 32 includes a main portion 322, two assembly portions 324 formed on opposite sides of the main portion 322, and two restricting portions 328 adjacent to the assembly portions 324. Each assembly portion 324 defines an assembly groove 3242, and a side wall of the assembly groove 3242 itself defines a sliding groove 3244 communicating with the assembly groove 3242. Each restricting portion 328 defines a restricting groove 3282 communicating with the assembly groove 3242. In the illustrated embodiment, the fixing base 32 is substantially rectangular.

Each terminal 34 includes a positioning portion 342, a connecting portion 344, and an inserting portion 346. The connecting portion 344 and the inserting portion 346 extend from opposite ends of the positioning portion 342 and in opposite directions. A plurality of resisting protrusions 3422 are formed on opposite sides of the positioning portion 342. Two opposite positioning protrusions 3424 are formed on an end of the positioning portion 342 adjacent to the inserting portion 346. The inserting portion 346 is connected between the positioning protrusions 3424, and a width of the inserting portion 346 is substantially equal to that of the restricting groove 3282. In the illustrated embodiment, the connecting portion 344 is arched, and the inserting portion 346 is substantially rectangular.

In assembly, the terminals 34 are configured to the fixing base 32, and the positioning portions 342 are inserted into the assembly grooves 3242 of the fixing base 32, until the positioning protrusions 3424 abut against the assembly portions 324, and then the inserting portion 346 is received in the restricting groove 3282 of the restricting portion 328, and the resisting protrusions 3422 are received in the sliding groove 3244, with the resisting protrusions 3422 resisting the side wall defining the sliding groove 3244.

Figure 2:
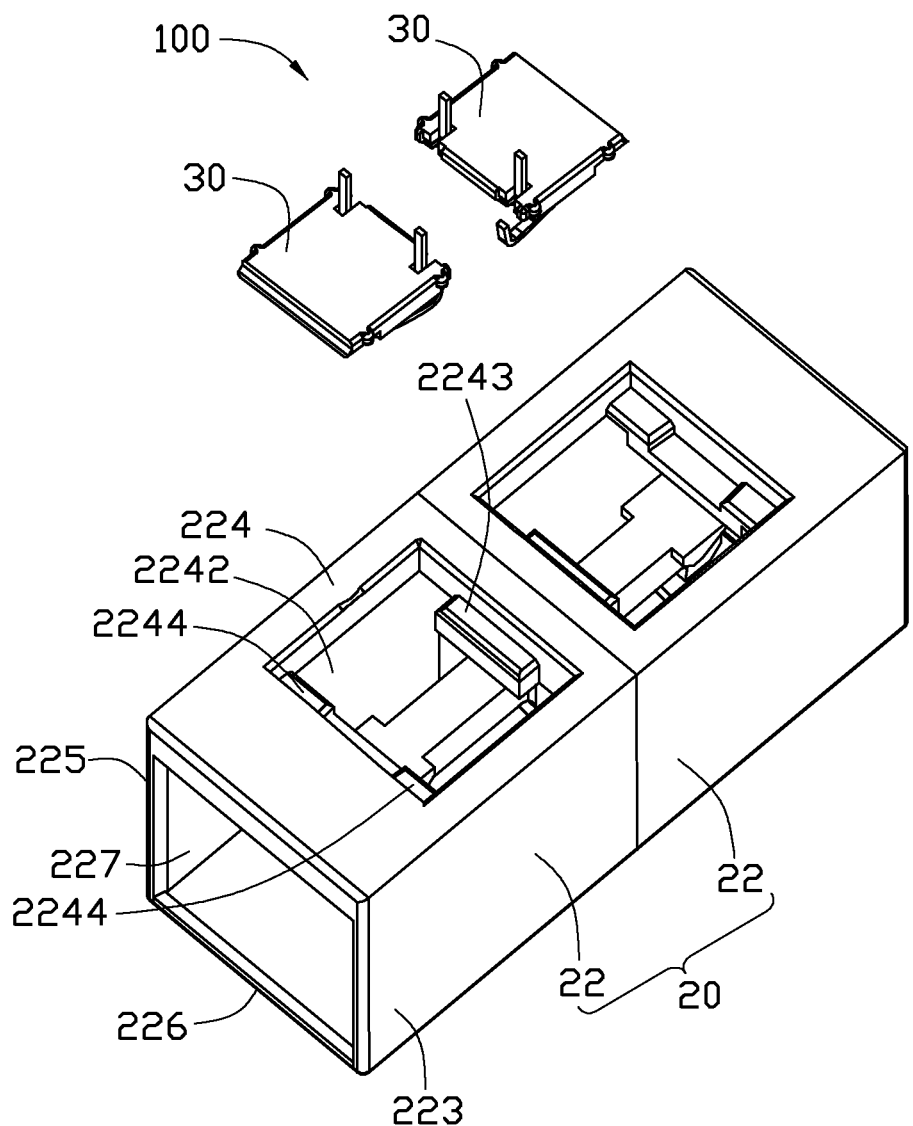
FIG. 2 is an exploded, isometric view of the optical fiber connector of FIG. 1, including an adapter.

Referring to FIGS. 2 and 3 again, after the adapters 30 are assembled, the adapters 30 are received in the assembly grooves 2242 of the receiving base 20, with the connecting portions 344 towards the inner side of the receiving base 20, and the adapters 30 are then supported by the first support portions 2243 and the second support portions 2244 (refer to FIG. 1).

In use, the connecting portions 344 are electrically connected to the optical fiber plugs, and the inserting portions 346 are electrically connected to the printed circuit board. Therefore, the adapters 30 electrically connect the optical fiber plugs to the printed circuit board.

In alternative embodiments, the resisting protrusions 3422 can be omitted, and the width of the positioning portion 342 is enlarged to be fittingly received in the sliding grooves 3244. In addition, there may be only one assembly portion 324 formed on the fixing base 32 for receiving the terminal 34.

The terminals 34 and the fixing bases 32 of the adapters 30 are separately formed, and the adapters 30 can be easily assembled to the fixing bases 32, therefore, precise positioning of the terminals in the injection mold for performing insert molding (integral manufacturing) with the fixing bases 32 is not required. Accordingly, the manufacture of the adapters 30 of this embodiment has a higher manufacturing efficiency.

Figure 5:
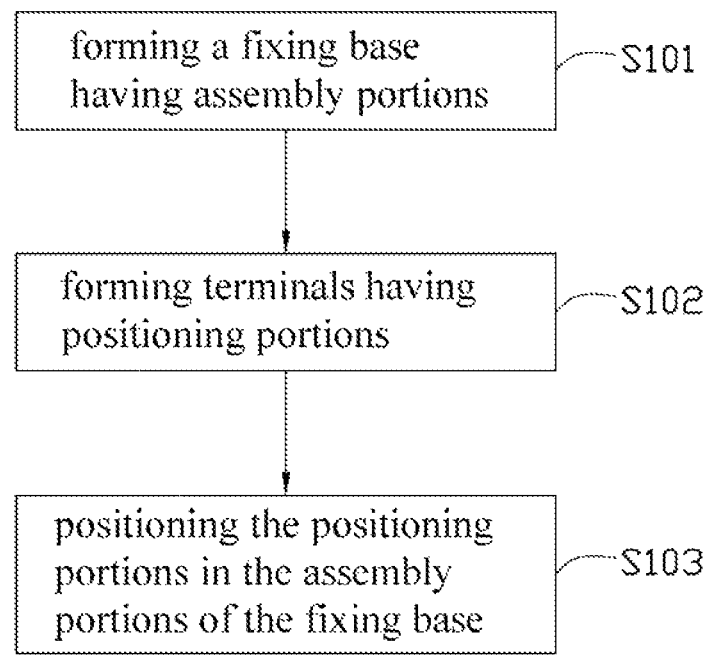
FIG. 5 is a flow chart of a method of manufacturing the adapter of FIG. 3.

Referring to FIG. 5, a manufacturing method of the adapter 30 is described as follow. In step S101, the fixing base 32 having the assembly portions 324 is formed. In the illustrated embodiment, the fixing base 32 is integrally formed of plastic. In step S102, the terminals 34 are formed, and each terminal has the connecting portion 344 and the inserting portion 346 extending from opposite ends of the positioning portion 342, respectively. In the embodiment, the terminals 34 are formed by punching. In step S103, the positioning portions 342 of the terminals 34 are positioned in the assembly portions 324 of the fixing base 32. The punching out of the connecting portions 344 and the inserting portions 346 from a metal plate (not shown) produces a plurality of terminals 34 which can be detached from the metal plate.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An adapter for an optical fiber connector comprising:
a fixing base having a main portion and at least one assembly portion formed on the main portion; and
at least one terminal having a positioning portion, a connecting portion, and an inserting portion; wherein the connecting portion and the inserting portion extend from opposite ends of the positioning portion, and the positioning portion is positioned in the assembly portion of the fixing base;
wherein the at least one assembly portion defines an assembly groove; the at least one terminal has a positioning portion inserted into the assembly groove; a side wall of the assembly groove defines a sliding groove communicating with the assembly groove; the positioning portion forms a plurality of resisting protrusions slidably received in the sliding groove, and the resisting protrusions abut against the side wall defining the sliding groove.

2. The adapter of claim 1, wherein the at least one assembly portion comprises two assembly portions positioned on opposite sides of the main portion; the at least one terminal comprises two terminals, and the terminals are positioned in the assembly portions.

3. The adapter of claim 1, wherein the at least one terminal further comprise a connecting portion and an inserting portion extending from opposite ends of the positioning portion.

4. The adapter of claim 3, wherein the fixing base further comprises at least one restricting portion adjacent to the at least one assembly portion, and the at least one restricting portion defines a restricting groove for receiving the inserting portion.

5. The adapter of claim 3, wherein the connecting portion is arched, and the inserting portion is substantially rectangular.

6. The adapter of claim 3, wherein two opposite positioning protrusions are formed on an end of the positioning portion adjacent to the inserting portion, and the inserting portion is connected between the positioning protrusions.

7. An optical fiber connector for fixing optical fiber comprising:
a receiving base; and
two adapters positioned on a side of the receiving base; each adapter comprising:
a fixing base having a main portion and at least one assembly portion formed on the main portion; and
at least one terminal having a positioning portion, a connecting portion, and an inserting portion; wherein the connecting portion and the inserting portion extend from opposite ends of the positioning portion, and the positioning portion is positioned in the assembly portion of the fixing base;
wherein the at least one assembly onion defines an assembly groove; the at least one terminal has a positioning portion inserted into the assembly groove; a side wall of the assembly groove defines a sliding groove communicating with the assembly groove; the positioning portion forms a plurality of resisting protrusions slidably received in the sliding groove, and the resisting protrusions abut against the side wall defining the sliding groove.

8. The optical fiber connector of claim 7, wherein the receiving base comprises two housing connected to each other, each housing comprises a first side plate, a second side plate, a third side plate, and a fourth side plate; the first side plate, the second side plate, the third side plate, and the fourth side plate cooperatively define a receiving groove.

9. The optical fiber connector of claim 8, wherein the second side plate defines an assembly groove communicating with the receiving groove; the adapter is received in the assembly groove.

10. The optical fiber connector of claim 8, wherein the second side plate further forms a plurality of support portions in the assembly groove, and the adapter is support by the support portions.

11. The optical fiber connector of claim 7, wherein the at least one assembly portion comprises two assembly portions positioned on opposite sides of the main portion; the at least one terminal comprises two terminals, and the terminals are positioned in the assembly portions.

12. The optical fiber connector of claim 9, wherein the at least one terminal further comprise a connecting portion and an inserting portion extending from opposite ends of the positioning portion.

13. The optical fiber connector of claim 12, wherein the fixing base further comprises at least one restricting portion adjacent to the at least one assembly portion, and the at least one restricting portion defines a restricting groove for receiving the inserting portion.

14. The optical fiber connector of claim 12, wherein two opposite positioning protrusions are formed on an end of the positioning portion adjacent to the inserting portion, and the inserting portion is between the positioning protrusions.

15. A manufacturing method of a adapter, comprising:
forming a fixing base having a plurality of assembly portions;
forming a plurality of terminals having a plurality of positioning portions; and
positioning the positioning portions in the assembly portions of the fixing base;
wherein the at least one assembly portion defines an assembly groove; the at least one terminal has a position portion inserted into the assembly groove; a side wall of the assembly groove defines a sliding groove communicating with the assembly groove; the positioning portion forms a plurality of resisting protrusions slidably received in the sliding groove, and the resisting protrusions abut against the side wall defining the sliding groove.

16. The manufacturing method of claim 15, wherein the fixing base is integrally formed by injection molding, and the terminals are formed by punching.

* * * * *